July 22, 1952 F. DENMAN Re. 23,524

FRUIT PICKING DEVICE

Original Filed Dec. 16, 1948

Inventor

FRANK DENMAN

By F. P. Kuiper

ATTORNEY

Reissued July 22, 1952

Re. 23,524

UNITED STATES PATENT OFFICE 23,524

FRUIT PICKING DEVICE

Frank Denman, Hillsdale, N. Y., assignor to
Giles E. Bullock, Rochester, N. Y.

Original No. 2,545,072, dated March 13, 1951, Serial No. 65,620, December 16, 1948. Application for reissue February 12, 1952, Serial No. 271,257

16 Claims. (Cl. 56—332)

Matter enclosed in heavy brackets [ ] appears in the original patent but forms no part of this reissue specification; matter printed in italics indicates the additions made by reissue.

The present invention relates to fruit picking equipment.

In picking fruits such as apples, oranges, peaches, and similar fruits, it is the usual practice for the picker to stand on a ladder leaned against the tree and pick into a pouch-like apron. At frequent intervals, the picker must descend the ladder, empty his apron into a larger receptacle and climp up again.

This is slow, tiring, and hazardous to the picker and injurious to the tree because many limbs are broken in moving the ladder. It also is wasteful because fruit is knocked off the tree and less accessible fruit is left on the tree because it cannot be reached readily from the ladder. In addition to the foregoing, it is necessary to handle ripe fruit with great care because the slightest bruise will result in subsequent spoilage.

The present invention provides an improved mechanical fruit picker which obviates the above, and many other objections and difficulties encountered in the usual practice.

One of the objects of the invention is to provide a vacuum-operated fruit picking apparatus that is readily portable from tree to tree and around a given tree to be picked, and which will reach substantially all fruit which is ready to be picked while the picker remains safely on the ground.

A further object of the invention is to provide equipment of the above-indicated character which reduces damage to the tree and to the fruit being picked.

A still further object of the invention is to provide vacuum-actuated fruit-picking equipment which permits cleaner picking of the tree and which eliminates the possibility of bruising or damaging the fruit being picked.

A still further object of the invention is to provide vacuum fruit-picking equipment wherein the fruit comes in contact only with parts made of soft rubber or fabric, the fruit being detached from the tree and conveyed to a basket, crate, or other container on the ground without substantial possibility of damage to the fruit.

Further objects of the invention will become apparent as the description proceeds, and the features of novelty will be pointed out in particularity in the appended claims.

The invention will be understood more particularly with reference to the accompanying drawings, in which Fig. 1 is a diagrammatic elevational view of the device in use.

Figure 4:
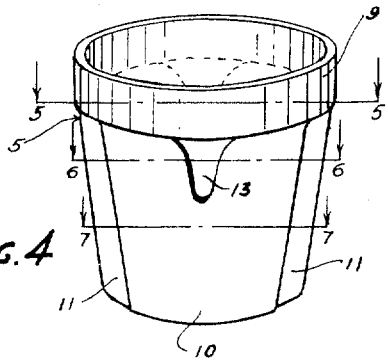
Fig. 4 is an enlarged perspective elevational view of the lower valve structure.
Figure 5:
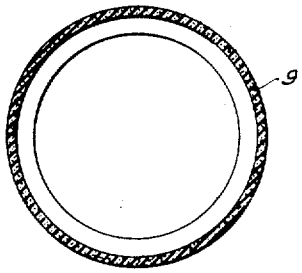
Figure 6:
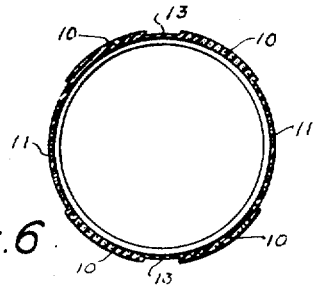
Figure 7:
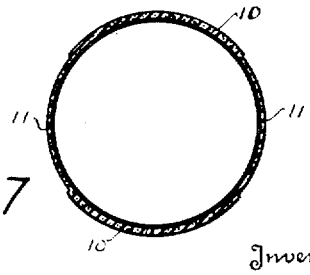

Figs. 5, 6 and 7 are cross sectional views taken on the line 5, 6 and 7, respectively, of Fig. 4.

Referring more particularly to the drawings, the improved construction of the invention includes a tubular handle element or wand A that is attached to a fruit-picking head B and through a flexible hose or similar flexible connection C to a vacuum pump D. The picking head B is connected to a flexible conveying conduit E, which is composed of canvas or other suitable fabric, and which leads to the fruit-receiving receptacle F.

The tubular handle or wand A may be of unitary construction or of telescopic or detachable sections so as to make it of any length necessary to reach the fruit to be picked in any portion of the tree, while the operator or picker G stands on the ground for manipulating the equipment.

The tubular handle wand A may be integrally or otherwise suitably connected to the tubular head B adjacent its upper end and extends at an angle forwardly therefrom. Said head B preferably is cylindrical in contour, and may be about one inch in diameter larger than the largest fruit to be picked.

Figure 2:
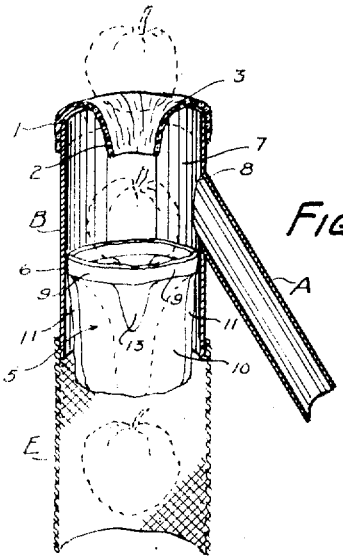
Fig. 2 is a sectional elevation of the head portion of the device with parts in full lines.
Figure 3:
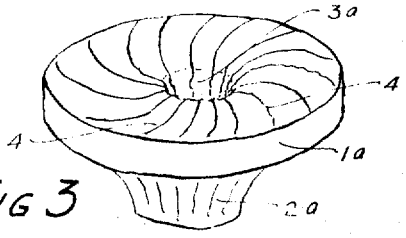
Fig. 3 is an enlarged perspective view of a modified form of valve cap.

The picking head B has its upper end closed with a cemented or otherwise attached fruit-engaging valve or cap 1 (Fig. 2), which is made of soft, resilient material, such as rubber or the like, and which is provided with a depending orifice portion 2, the opening 3 thereof being expansible, and forms the upper valve member. The modified cap 1a (Fig. 3) is similar to cap 1 except the orifice portion 2a and opening or valve seat 3a is formed with spiral accordion or convoluted folds 4. The valve cap 1 renders the vacuum operative to draw the fruit being picked through the orifice portion 2 and the aperture 3 therein, the fruit passing into an inverted conical lower valve member 5, which is somewhat in the form of a sleeve attached as at 6 to the inner surface of the picker head B. Said valve member 5 mounted as at 6 within head B forms a cavity or suction chamber 7 intermediate said valves 1 and 5, and which is in communication with a vacuum pump D through opening 8, handle portion A and flexible hose C.

Valve member 5 comprises a heavy rubber, or the like collar 9 adhesively, riveted or otherwise firmly and sealingly secured as at 6 adjacent to the lower edge of the opening 8. Integrally formed with and depending from collar 9 are the diametrically opposed relatively heavy fabric reinforced rubber flap, apron, or members 10. Said members are joined along their vertical edges by thin flexible connecting rubber strips 11 which are coextensive with the length of said flaps. Said flaps 10 and strips 11 tapering in the direction of and to the lower free end of the sleeve or valve portion 12 (Fig. 4). The flap portions 10 are provided with the substantially triangular thin rubber portions 13 integrally connected therewith and with collar 9 at their upper ends to provide the proper operative flexible actions to said flaps, which latter though flexible are sufficiently stiff, so that they will close against each other when moving into valve closing engagement, but will not be sucked up into the suction chamber 7. This lower valve 5 is adapted to slightly retard the descent of the fruit, but to yield under its weight to allow it to pass into the flexible conduit E, which while delivering it to a padded or cushioned receptacle F, by reason of its flexibility acts as a brake to decrease the force of its impact when received by said receptacle.

The valve cap 1 may be formed with a plain expansible throat or orifice portion 2 (Fig. 2) but it has as modified been described as being formed with the spiral convoluted folds 4, and the discharge opening is slightly smaller than the smallest fruit it will be used to pick. While control of the vacuum pump D can be effected by the operator in any well known manner, if desired it may be controlled from the handle A as at 14.

Figure 1:
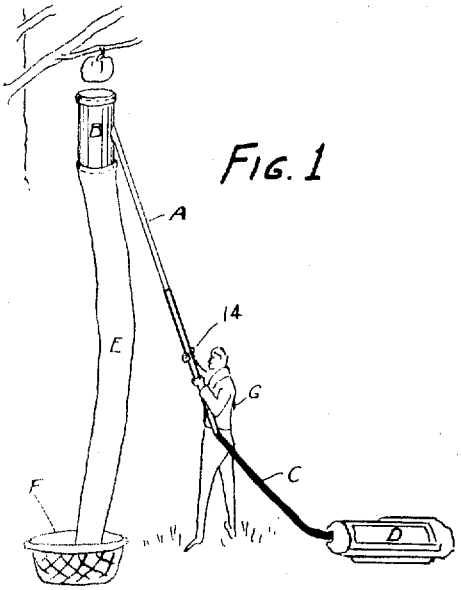

When the vacuum pump has been started and the device is in substantially the position shown in Fig. 1 and cap valve 1 is placed [over] *around* the fruit (Fig. 2) so that the latter seals the opening, and the suction in the cavity or suction chamber 7 closes the lower valve 5 creating a fairly high vacuum that *holds the valve closed and* draws the fruit through the expansible throat or orifice portion 2 and opening 3 *exerting a pull sufficient to detach the fruit from the tree* and when the cap is provided with the expansible spiral or convoluted folds 4 they unwind as the fruit passes through and which latter is given a twist which helps to detach it from the tree.

As the fruit clears the opening 3 the vacuum in the chamber 7 is broken and the lower valve member 5, *which was held closed by such vacuum, while the opening was sealed,* opens under the weight of the fruit and it passes into the fabric sleeve E and slides to the ground, where its fall, if desired, may be broken by a suitable pad or the like (not shown) in the basket or other receptacle F.

It will be apparent that while the embodiment shown in the accompanying drawings and the foregoing description is a typical representation of the invention, it also is obvious that structural details can be varied without departing from the inventive concept. For example, the convolutions 4 of the picking head cap 1 may be omitted as is indicated above, and the valve members may be varied in their structural details. Metal parts, such as the wand handle A and the picking head B, are made of light weight metal, such as thin sheet steel or aluminum for facilitating portability and ease of manipulation while providing strength and rigidity, also such parts may be constructed from plastic or other suitable material. It will be understood, accordingly, that it is intended and desired to embrace within the scope of this invention such modifications and changes as may be necessary to adapt it to varying conditions and uses, as defined by the appended claims.

Although in practice it has been found that the form of the invention illustrated in the accompanying drawings and referred to in the above description as the preferred embodiment is the most efficient and practical, yet realizing that conditions concurrent with the adoption of the invention will necessarily vary, it is desired to emphasize that various minor changes in details of construction, proportion and arrangement of parts, may be resorted to within the scope of the appended claims without departing from or sacrificing any of the principles of this invention.

Having thus described the invention, what I desire protected by Letters Patent is as set forth in the following claims:

1. Fruit picking apparatus comprising, a manually portable picking assembly including, in combination, a tubular handle member adapted to be connected to a source of vacuum, a tubular fruit-picking head communicating with the handle member, a cushioned apertured fruit engaging valve cap covering the upper end of the picking head, the aperture being smaller than the smallest fruit to be picked but expansible to allow the fruit to be drawn through the aperture into the head responsive to suction applied into the head from the source of vacuum through the handle member, a second yieldable valve member in the head adapted to receive the fruit being drawn through the aperture, said second valve member being closed responsive to suction in the head as the fruit is drawn into and through the aperture in the fruit-engaging cap, but operable responsive to the weight of the fruit received in the second valve and release of suction in the picking-head when the fruit passes out of the said aperture, and a flexible fruit conveying cushioning conduit connected to the head and adapted to convey the picked fruit to the ground without injury to the fruit.

2. Fruit picking apparatus comprising, a manually portable picking assembly comprising, in combination, a tubular handle member adapted to be connected to a source of vacuum, a tubular fruit-picking head communicating with the handle member, an apertured resilient fruit-engaging valve-cap covering the upper end of said head, the aperture being smaller than the smallest fruit to be picked, the fruit adapted to close said valve when engaged therewith, said valve being expansible to allow the fruit to be drawn through the aperture into the head responsive to suction applied into the head through the handle member, a second yieldable valve member in the head adapted to receive the fruit being drawn through the aperture, the second valve member being an inverted substantially conical hollow member having its large end peripherally secured to the head interiorly thereof, the valve member including depending flexible members adapted to be closed responsive to suction in the head while the aperture is sealed by the fruit, but yieldable to open under the weight of the fruit responsive to release of the suction in the head as the fruit is released from the aperture, and flexible cushioning conveying means connected to the head for conveying the picked fruit to the ground without damage.

3. A fruit picking device comprising, a manually picking assembly comprising, in combination, a tubular handle member adapted to be connected to a source of vacuum, a hollow fruit-picking head communicating with the handle member and adapted to be evacuated by the source of vacuum, a resilient, expansible fruit-engaging valve member on the fruit-picking head having an aperture therethrough extending into the head adapted to be sealed by the fruit being picked while being yieldable to allow the fruit to be drawn through the aperture in response to suction applied to the picking head, means in the said head for receiving the fruit as released from the aperture and for passing it out of the head, and flexible tubular conveying means connected to the head for conveying the picked fruit to the ground without damage.

4. A fruit picking device comprising, a manually portable picking assembly comprising, in combination, a tubular handle member adapted to be connected to a source of vacuum, a hollow fruit-picking head communicating with the handle member and adapted to be evacuated therethrough by the source of vacuum, a resilient fruit-engaging cap on the fruit-picking head having an aperture therethrough extending into the head adapted to be sealed by the fruit being picked, while allowing the fruit to be drawn through the aperture in response to suction applied to the picking head through the tubular handle, valve means in the said head adapted to be closed under action of the suction while the fruit is being drawn through the said aperture, while being adapted to receive the fruit from said aperture and to pass it out of the head responsive to release of said suction, and flexible resilient tubular conveying means connected to said head for receiving the fruit and conveying it to the ground without damage.

5. A fruit picking device comprising a manually portable picking assembly comprising in combination, a tubular handle member adapted to be connected to a source of vacuum, a fruit-picking head communicating with the handle member for having suction applied thereto from the source of vacuum through the handle, a resilient fruit-engaging cap on said head having an aperture therethrough extending into the head adapted to be sealed by fruit being picked while being yieldable to allow the fruit to be drawn through the aperture in response to suction applied to the picking head, valve means in the said head adapted to be closed under action of the suction while the fruit is being drawn through the said aperture and adapted to receive and to pass the fruit from the head responsive to release of the suction as the fruit is released from said aperture, the said valve means being resiliently yieldable and including depending apron members operable under the weight of the fruit received therein, said apron members possessing sufficient rigidity to prevent them from being drawn upwardly into the head under action of said suction, and resilient, flexible tubular conveying means connected to the head for receiving the fruit and conveying it to the ground without damage.

6. A fruit picking device comprising a manually portable picking assembly comprising a hollow picking head mounted on and communicating with a tubular handle member, said handle adapted to be connected to a source of vacuum and through which said head is adapted to be evacuated, a resilient fruit-engaging valve cap on said head having an aperture therethrough extending into the head, adapted to be sealed by fruit being picked while allowing the fruit to be drawn through the aperture in response to suction applied to the picking-head, valve means in said head adapted to be closed under suction applied to the head while the fruit is being drawn through the said aperture, while being adapted to receive the fruit and to open under the weight thereof for passing it out of the head responsive to release of the suction as the fruit is released from the aperture, resilient flexible tubular conveying means connected to the head for releasing the fruit and conveying it to the ground without damage, and means enabling adjustment of the length of the handle member for enabling an operator to manipulate the picking head to any portion of a tree to be picked, while the operator remains on the ground.

7. A fruit picking device comprising a manually transportable picking assembly comprising, in combination, a tubular handle member adapted to be connected to a source of vacuum, a hollow fruit-picking head communicating with the handle member and adapted to be evacuated therethrough, a resilient fruit-engaging valve cap on said head having an aperture therethrough extending into the head adapted to be sealed by a fruit being picked while allowing the fruit to be drawn through the aperture in response to suction applied to the picking head, valve means in said head including depending resilient apron members adapted to be closed under the action of the suction in said head while the fruit is being drawn through said aperture, and releasable to receive and permit passage therethrough of said fruit as the vacuum in said head is broken by discharge of the fruit from said aperture, means connected to the head for receiving the fruit passed by said valve means and conveying it to a receiver without damage, said fruit-engaging valve cap and aperture being provided with spiral extensible folds adapted to impart a twisting motion to the fruit for facilitating picking thereof.

8. A fruit picking device comprising a manually transportable picking assembly comprising, in combination, a tubular handle member adapted to be connected to a source of vacuum, a tubular fruit-picking head rigidly connected to and communicating with the handle member and adapted to be evacuated therethrough, a resilient apertured fruit-engaging valve cap covering the upper end of the fruit-picking head, said aperture being adapted to be sealed by the fruit being picked while allowing the fruit to pass through the aperture into the picking head under action of suction applied to the picking-head through said handle member, a valve member in the head below the said cap and spaced therefrom for receiving the fruit drawn through the aperture, said valve member comprising an inverted substantially conical hollow member having its larger end formed of an annular securing part having an outside diameter equal to the inside diameter of the picking head, said annular securing part being secured to the inner surface of the picking head, relatively stiff but resilient flap like aprons depending from the securing part, yieldable resilient members connecting the aprons and coextensive in length therewith, said connecting members enabling the aprons to be drawn together to seal the picking head during passage of fruit through the aperture responsive to vacuum in the picking head, said aprons being prevented by their rigidity from being drawn into the picking head by the vacuum therein, said connecting members permitting relative expansion between the aprons under weight of the fruit received in the valve member and responsively to a break in the vacuum in the head as the fruit is released from the aperture, thereby allowing the fruit to pass from the picking head through said valve, and flexible resiliently cushioning conduit means connected to the picking head for receiving the fruit passed by the valve member and for conveying it to the ground without damage.

9. A fruit picking device comprising a manually transportable picking assembly comprising, in combination, a fruit picker head, a tubular handle communicating with and rigidly connected to said head intermediate its length, said handle adapted to be connected with a source of vacuum, a resilient valve cap member mounted on said picker head and comprising an apertured portion constituting a fruit-engaging valve seat, a lower valve member in said head and forming with said valve cap a vacuum or suction chamber in connection with said handle, said lower valve comprising a resilient structure restrictively tapering to its lower end and including opposed thickened valve closing portions adapted to effect closing of said valve when suction is applied to said chamber upon engagement of a fruit with said valve seat, and automatically openable upon the passage of the fruit from said upper valve, to permit passage of the fruit from said head.

10. A fruit picking device comprising a manually transportable picking assembly comprising, in combination, a fruit picking nozzle adapted to be connected to a source of vacuum, the said nozzle including a rigid tubular body member, a fruit picking cap mounted on an end of the rigid member and comprising a resilient closure valve for the said rigid member, the valve having an expansible opening therethrough smaller in diameter than the smallest fruit to be picked and defining a seat for the fruit during detachment of fruit from a tree being picked under action of the vacuum applied to the rigid member, the said opening in the valve being expansible under suction imparted to the fruit during detachment thereof for causing the vacuum to pull the detached fruit through the said valve into the rigid member, a second resilient valve member closing an opposite end of the said rigid body member for receiving the fruit as it is pulled by the vacuum in the body member through the first-mentioned valve, the said second valve member comprising depending separable apron members, means securing the apron members to the rigid body member adjacent to the said opposite end thereof, and resilient, flexible web members interconnecting the said apron members for causing the suction in the rigid body member to maintain the apron members closed during drawing of the fruit through the first mentioned valve, the said web members being expansible under weight of the said fruit responsive to suction in the tubular member becoming released as the fruit is drawn clear through the first mentioned valve and into the rigid body member, stretching of the web members allowing opening of the said depending aprons to enable the fruit to pass therethrough, the said depending aprons having a stiffness preventing them becoming sucked into the body member by the said suction.

11. A fruit picking device comprising a manually transportable picking assembly comprising, in combination, a fruit picking nozzle adapted to be connected to a source of vacuum, the said nozzle including a rigid tubular body member having opposite ends closed by a pair of complementary resilient valve instrumentalities actuated by fruit being picked in cooperation with suction imparted to the interior of the body member intermediate the valve instrumentalities, certain of the valve instrumentalities comprising a resilient, apertured closure cap for the body member having an aperture therethrough smaller in diameter than the smallest fruit being picked and forming a seat for the fruit against which the fruit is seated during detachment thereof by suction in the rigid body member, the aperture being expansible to permit the fruit to be pulled therethrough by the suction responsively to detachment of the fruit and to close under action of the suction as the fruit is drawn clear thereof into the said rigid body member, the said complemental valve instrumentalities being also closed by the said suction until the said fruit is passed thereby to the said complemental valve instrumentalities, these complemental valve instrumentalities comprising separable apron members firmly and annularly secured to the rigid body member and flexible resilient web members intermediate and interconnecting the said apron members, the web members being yieldable responsively to engagement of the fruit passing to the said complemental valve instrumentalities for allowing separation of the said apron members responsively to release of suction in the rigid body member for passage of the fruit through the apron members while maintaining the apron members closed relative to the body member while suction is being maintained in the said body member as the fruit is being detached and drawn through the first-mentioned valve instrumentalities.

12. A fruit picking device comprising a manually transportable picking assembly comprising, in combination, a fruit picking nozzle adapted to be connected to a source of vacuum, the said nozzle including a rigid tubular body member having opposite ends closed by a pair of complementary resilient valve instrumentalities actuated by fruit being picked in cooperation with suction imparted to the interior of the valve instrumentalities, certain of the valve instrumentalities comprising a resilient, apertured closure cap for the body member having an aperture therethrough smaller in diameter than the smallest fruit being picked and forming a seat for the fruit against which the fruit is seated in sealing engagement with the aperture during detachment of the fruit by suction in the rigid body member, spirally-directed folds on the closure cap extending into the closure top aperture for imparting a twisting motion to the fruit for facilitating detachment thereof, the said aperture being expansible to permit the fruit to be pulled therethrough by the suction in the rigid body member and to close under the suction as the fruit is drawn clear thereof into the said rigid body member, the said complemental valve instrumentalities being closed by the said suction until the fruit engagement with the said instrumentalities, the said complemental valve instrumentalities comprising separable apron members being firmly and annularly secured to the rigid body member and flexible resilient web members interconnecting the said apron members, the web members being yieldable under weight of the fruit responsively to engagement of the fruit passing to the said complemental valve instrumentalities for allowing separation of the said apron members responsively to release of suction in the rigid body member for passage of the fruit through the apron members while maintaining the apron members closed relative to the body member while suction is being maintained in the said body member as the fruit is being detached and drawn through the said closure cap valve, the said apron members having a stiffening sufficient to resist the suction for preventing the complemental valve instrumentalities being drawn inwardly into the body member by the suction.

*13. Fruit picking apparatus comprising, a manually portable picking assembly including, in combination, a tubular support member adapted to be connected to a source of vacuum, a tubular fruit-picking head communicating with the tubular member, a cushioned apertured fruit engaging valve cap covering the upper end of the picking head, the aperture being smaller than the smallest fruit to be picked but expansible to allow the fruit to be drawn through the aperture into the head responsive to suction applied into the head from the source of vacuum through the tubular member, and a second yieldable valve member in the head adapted to receive the fruit being drawn through the aperture, said second valve member being held closed responsive to suction in the head as the fruit is drawn into and through the aperture in the fruit-engaging cap, but operable responsive to the weight of the fruit received in the second valve and release of suction in the picking-head when the fruit passes out of the said aperture.*

*14. A fruit picking device comprising, a manually picking assembly comprising, in combination, a tubular support member adapted to be connected to a source of vacuum, a hollow fruit-picking head communicating with the tubular member and adapted to be evacuated by the source of vacuum, a resilient, expensible fruit-engaging valve member on the fruit-picking head having an aperture therethrough extending into the head adapted to be sealed by the fruit being picked while being yieldable to allow the fruit to be drawn through the aperture in response to suction applied to the picking head, and means in said head for receiving the fruit as released from the aperture and for passing it out of the head.*

*15. A fruit picking device comprising, a manually portable picking assembly comprising, in combination, a tubular support member adapted to be connected to a source of vacuum, a hollow fruit-picking head communicating with the support member and adapted to be evacuated therethrough by the source of vacuum, a resilient fruit-engaging cap on the fruit-picking head having an aperture therethrough extending into the head adapted to be sealed by the fruit being picked, while allowing the fruit to be drawn through the aperture in response to suction applied to the picking head through the tubular member, and valve means in said head adapted to be held closed under action of the suction while the fruit is being drawn through the said aperture, while being adapted to receive the fruit from said aperture and to pass it out of the head responsive to release of said suction.*

*16. A fruit picking device comprising a manually portable picking assembly comprising a hollow picking head mounted on and communicating with a tubular member, said tubular member being adapted to be connected to a source of vacuum and through which said head is adapted to be evacuated, a resilient fruit-engaging valve cap on said head having an aperture therethrough extending into the head, adapted to be sealed by fruit being picked while allowing the fruit to be drawn through the aperture in response to suction applied to the picking-head, and valve means in said head adapted to be held closed under suction applied to the head while the fruit is being drawn through the said aperture, while being adapted to receive the fruit and to open under the weight thereof for passing it out of the head responsive to release of the suction as the fruit is released from the aperture.*

FRANK DENMAN.

REFERENCES CITED

The following references are of record in the file of this patent or the original patent:

UNITED STATES PATENTS

| Number | Name | Date |
|---|---|---|
| 31,165 | Griffin | Jan. 22, 1861 |
| 65,416 | Morton | June 4, 1867 |
| 270,955 | Key | Jan. 23, 1883 |
| 419,761 | Finley | Jan. 21, 1890 |
| 492,824 | McLean | Mar. 7, 1893 |
| 1,185,110 | Le Baron | May 30, 1916 |
| 2,131,672 | Rich | Sept. 27, 1938 |